(12) United States Patent
Lacy

(10) Patent No.: US 11,193,563 B2
(45) Date of Patent: Dec. 7, 2021

(54) SYNCHRONOUS BELT DRIVE SYSTEM

(71) Applicant: Gates Corporation, Denver, CO (US)

(72) Inventor: William Fraser Lacy, Westland, MI (US)

(73) Assignee: Gates Corporation, Denver, CO (US)

( * ) Notice: Subject to any disclaimer, the term of this patent is extended or adjusted under 35 U.S.C. 154(b) by 716 days.

(21) Appl. No.: 15/642,041

(22) Filed: Jul. 5, 2017

(65) Prior Publication Data

US 2019/0011020 A1  Jan. 10, 2019

(51) Int. Cl.
*F16H 7/02* (2006.01)
*F16H 55/17* (2006.01)
*F16H 35/00* (2006.01)
*F01L 1/02* (2006.01)
*F01L 1/047* (2006.01)

(52) U.S. Cl.
CPC .............. *F16H 7/023* (2013.01); *F01L 1/024* (2013.01); *F01L 1/047* (2013.01); *F16H 35/00* (2013.01); *F16H 55/171* (2013.01); *F01L 2820/01* (2013.01); *F16H 2035/003* (2013.01)

(58) Field of Classification Search
CPC .... F16H 2035/003; F16H 35/02; F01L 1/022; F01L 1/024; F01L 1/02
USPC ........................................................ 474/141
See application file for complete search history.

(56) References Cited

U.S. PATENT DOCUMENTS

| | | | | |
|---|---|---|---|---|
| 3,583,250 A * | 6/1971 | Kongelka | ............... | F16H 7/023 474/133 |
| 4,725,260 A | 2/1988 | Komorowski et al. | | |
| 5,178,108 A * | 1/1993 | Beaber | ...................... | F01L 1/02 123/90.27 |
| 5,931,052 A * | 8/1999 | Zhao | ..................... | F16F 15/315 123/192.1 |
| 6,213,905 B1 * | 4/2001 | White | ....................... | F16H 7/06 474/148 |
| 6,877,467 B2 * | 4/2005 | Katayama | ................. | F01L 1/02 123/90.17 |

(Continued)

FOREIGN PATENT DOCUMENTS

| CN | 101440867 A | 5/2009 |
|---|---|---|
| DE | 19520508 A1 | 12/1996 |

(Continued)

OTHER PUBLICATIONS

European Patent Office, International Search Report and Written Opinion of the International Searching Authority, International application No. PCT/US2018/040965, dated Mar. 6, 2019.

(Continued)

*Primary Examiner* — Henry Y Liu
(74) *Attorney, Agent, or Firm* — Alyssa K. Sandrowitz, Esq.

(57) ABSTRACT

A synchronous belt drive system comprising a first obround sprocket having a toothed surface and at least one linear portion disposed between two arcuate portions, the arcuate portions having a constant radius, the linear portion having a predetermined length, a sprocket having a toothed surface, the sprocket engaged to the first obround sprocket by an endless toothed member, and the first obround sprocket having a magnitude and a phase such that an angular displacement timing error between the sprocket and the first obround sprocket is less than 1.5 degree peak to peak.

20 Claims, 16 Drawing Sheets

(56) References Cited

U.S. PATENT DOCUMENTS

| | | | | |
|---|---|---|---|---|
| 7,044,875 B2* | 5/2006 | Gajewski | ................ | F01L 1/02 474/148 |
| 7,232,391 B2 | 6/2007 | Gajewski | | |
| 7,461,624 B2* | 12/2008 | Ullein | ................ | F16F 15/264 123/192.2 |
| 7,493,880 B2* | 2/2009 | Gajewski | ................ | F01L 1/022 123/90.17 |
| 7,720,650 B2* | 5/2010 | Gajewski | ................ | F01L 1/02 703/1 |
| 7,857,720 B2* | 12/2010 | Lacy | ................ | F01L 1/024 474/141 |
| 8,042,507 B2* | 10/2011 | Gajewski | ................ | F01L 1/022 123/90.17 |
| 8,303,444 B2 | 11/2012 | Gajewski | | |
| 8,342,993 B2* | 1/2013 | Gajewski | ................ | F16H 35/02 474/141 |
| 8,430,775 B2* | 4/2013 | Todd | ................ | F01L 1/02 474/148 |
| 8,550,945 B2* | 10/2013 | Gajewski | ................ | F16H 55/36 474/166 |
| 9,927,001 B2 | 3/2018 | Di Meco et al. | | |
| 2003/0087714 A1* | 5/2003 | Todd | ................ | F16H 55/30 474/156 |
| 2003/0104886 A1* | 6/2003 | Gajewski | ................ | F01L 1/02 474/87 |
| 2007/0066430 A1* | 3/2007 | Gajewski | ................ | F01L 1/022 474/141 |
| 2008/0085799 A1* | 4/2008 | Lacy | ................ | F01L 1/024 474/141 |
| 2010/0160100 A1* | 6/2010 | Gajewski | ................ | F16H 35/02 474/141 |

FOREIGN PATENT DOCUMENTS

| | | |
|---|---|---|
| DE | 102005057357 A1 | 6/2007 |
| EP | 425246 A1 | 5/1991 |
| JP | 62258109 A | 11/1987 |

OTHER PUBLICATIONS

European Patent Office, International Search Report, International application No. PCT/US2018/039989, dated Nov. 13, 2018.

* cited by examiner

SYNCHRONOUS BELT DRIVE SYSTEM

FIELD OF THE INVENTION

The invention relates to a synchronous belt drive system, and more particularly to a system having an obround sprocket having a magnitude and a phase such that an angular displacement timing error between a sprocket and the obround sprocket is less than 1.5 degree peak to peak.

BACKGROUND OF THE INVENTION

A wide variety of automotive and industrial internal combustion engines routinely rely upon a synchronous belt drive system to transmit torque from a driver sprocket on a crankshaft to a driven sprocket such as on a camshaft. Camshafts produce vibrations which can be detrimental to the operating life of the engine and synchronous belt drive system. In particular, actuation of the intake and exhaust valves through contact with the camshaft lobes causes a cyclic fluctuating torque load to be transmitted through the synchronous belt drive system.

Prior art attempts to attenuate the fluctuating torque loads include use of camshaft dampers as well as damped belt tensioners.

Teachings disclose the use of non-circular (oval) sprockets to control strongly fluctuating torques, for example, VDI Progress Reports No. 272, "Non-Uniform Transmission Belt Drives" by Dipl.-Ing. Egbert Frenke.

Other attempts include use of a rotor having an oval non-circular profile having at least two protruding alternating with receding portions. The rotary load assembly presents a periodic fluctuating belt tension when driven in rotation in which the angular positions of the protruding and receding portions of the non-circular profile relative to the angular position of the second rotor, and their magnitude, substantially cancels the alternating belt tensions caused by fluctuating load torque of the rotating assembly.

Representative of the art is U.S. Pat. No. 7,857,720 which discloses a synchronous belt drive system comprising an obround sprocket having a toothed surface and at least one linear portion disposed between two arcuate portions, the arcuate portions having a constant radius, the linear portion having a predetermined length, a second sprocket having a toothed surface, the second sprocket engaged to the obround sprocket by an endless toothed member, the second sprocket connected to a rotary load, the rotary load having cyclic torque fluctuations, and a radius of the obround sprocket oriented at a belt entry point which coincides with a maximum amplitude of a cyclic torque fluctuation such that a span length of the endless toothed member is made to vary in a manner that substantially cancels the cyclic tension fluctuations.

What is needed is a belt drive sprocket system comprising an obround sprocket having a magnitude and a phase such that an angular displacement timing error between a sprocket and the obround sprocket is less than 1.5 degree peak to peak. The instant invention meets this need.

SUMMARY OF THE INVENTION

The primary aspect of the invention is to provide a belt drive sprocket system comprising an obround sprocket having a magnitude and a phase such that an angular displacement timing error between a sprocket and the obround sprocket is less than 1.5 degree peak to peak.

Other aspects of the invention will be pointed out or made obvious by the following description of the invention and the accompanying drawings.

The invention comprises a synchronous belt drive system comprising a first obround sprocket (10) having a toothed surface and at least one linear portion (16) disposed between two arcuate portions (14,15), the arcuate portions having a constant radius (R1, R2), the linear portion having a predetermined length, a sprocket (300) having a toothed surface, the sprocket engaged to the first obround sprocket by an endless toothed member (200), and the first obround sprocket (10) having a magnitude and a phase such that an angular displacement timing error between the sprocket and the first obround sprocket is less than 1.5 degree peak to peak.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
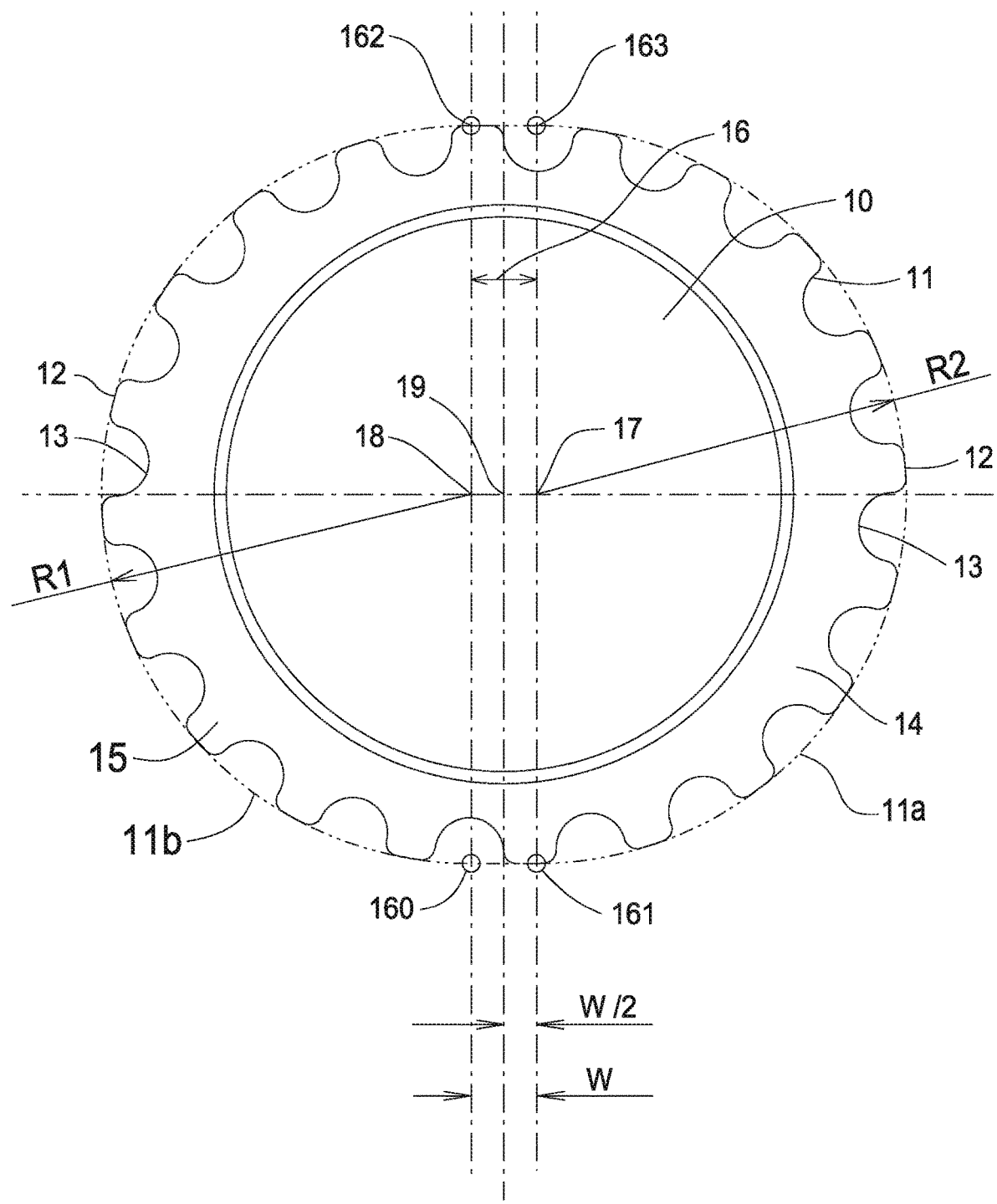
FIG. 1 is a side view of an obround sprocket.

FIG. 1 is a side view of an obround sprocket. The inventive sprocket 10 comprises a toothed surface 11. Toothed surface 11 engages a toothed belt. Toothed surface comprises land areas 12 and adjacent grooves 13. The grooves 13 have a shape that is compatible with the corresponding design of a tooth form of a toothed belt. Toothed belts are also referred to as synchronous belts since they are used to synchronize the rotation of a driver and driven sprocket.

Sprocket 10 comprises portion 14 and portion 15. Portion 14 has an arcuate toothed surface 11a which comprises a constant radius R2. Portion 15 has an arcuate toothed surface 11b which comprises a constant radius R1. Portions 14 and 15 are segments of a circle since the radii R1 and R2 are equal and constant. Use of circular segments in this manner reduces the complexity of the design and manufacturing process for the inventive sprocket.

Disposed between portion 14 and portion 15 is linear portion 16. Portion 16 comprises a rectangular section which has the effect of displacing each portion 14 and 15 from each other, thus giving the obround shape to the sprocket. The sprocket surface 11 is straight, i.e., linear or flat between points 160 and 161, and 162 and 163.

The flat portion 16 has a length which relates to a system torque fluctuation amplitude. In this embodiment portion 16 has a dimension (W) of approximately 2 mm between points 160 and 161, and 162 and 163. Hence, the center of curvature 17 of portion 14 is displaced by a distance of W/2, approximately 1 mm, from the center of rotation 19 of the sprocket. Also, the center of curvature of portion 15 is displaced by a distance of W/2, approximately 1 mm, from the center of rotation 19 of the sprocket. The dimensions given are only for the purpose of illustration and are not intended to be limiting. It also follows that a major length (ML) of the sprocket has a dimension:

$$L_{major} = R1 + R2 + W.$$

A major segment (MG) for each portion 14, 15 has a dimension:

$$MG = (R1 + W/2) \text{ or } (R2 + W/2).$$

A minor length has a dimension:

$$L_{minor} = R1 + R2$$

The length (W) of portion 16 is determined by the radius of portions 14 and 15 and is dependent on the dynamic angular vibration characteristic which is being counteracted which is described elsewhere in this specification. Sprocket 10 can be designed using constant surface pitch, constant angular pitch or a combination of the two. "Surface Pitch" is defined as the distance between any two consecutive, corresponding, "pitch points" on the OD of the sprocket, measured around the OD line.

Constant Surface Pitch is calculated as follows:

$$SP = (((((Ng \times Nom\ Pitch)/Pi) - PLD) \times Pi)/Ng)$$

Where
SP=Surface Pitch
Ng=Number of grooves in sprocket
Nom Pitch=Nominal system pitch
Pi=~3.141
PLD=Diametral PLD of the system "Angular Pitch" is defined as the angular difference between any two consecutive, corresponding "pitch points" on a sprocket and may be measured in degrees or radians.

Constant Angular Pitch is defined as follows:

$$AP = 360/Ng \text{ Degrees}$$

Where
AP=Angular Pitch
Ng=Number of grooves in sprocket

The sprocket groove profile can be individually designed to suit the particular dynamics of the engine The elastic modulus of the span of the belt, in combination with the tooth modulus and the sprocket offset (W/2) is optimized to substantially reduce or cancel tension fluctuations at predetermined engine speeds. Consequently, in this application the belt is analyzed and designed as a spring member of the system in addition to being sized to transmit the required tensile loads. The system dynamic response is selected by iterative process to arrive at a combination of belt modulus and obround sprocket radius (R1 and R2) which substantially reduces or cancels all of the tension fluctuations otherwise transmitted through the belt and the belt drive system.

Figure 2:
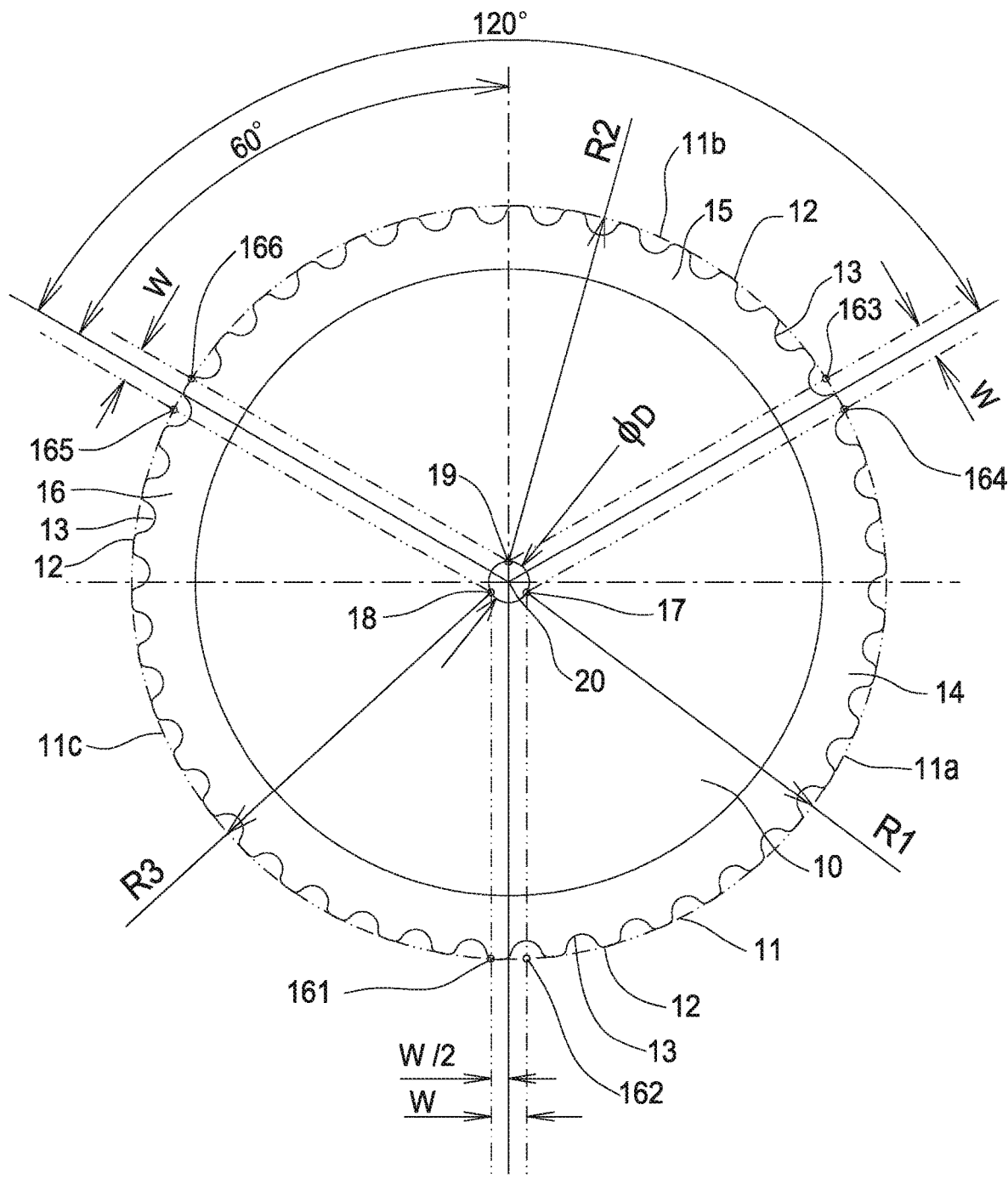
FIG. 2 is a side view of an alternative embodiment of the sprocket.
Figure 9:
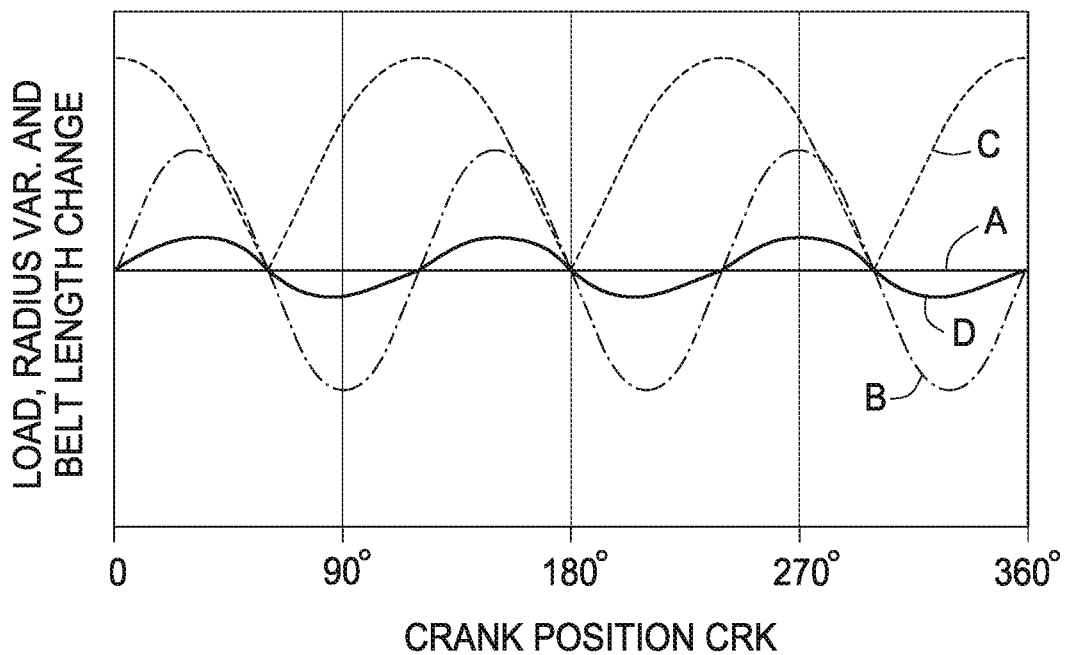
FIG. 9 is representative of the $1.5^{th}$ order load characteristic for a driver sprocket of a four cylinder, four stroke common rail diesel engine with 3 piston fuel pump, (or other device inducing a $1.5^{th}$ order).

FIG. 2 is a side view of an alternate embodiment of the sprocket. This embodiment comprises three linear segments disposed between arcuate portions 14, 15, 16 as otherwise described in FIG. 1. The three linear segments (161 to 162) and (163 to 164) and (165 to 166) are disposed between each arcuate portion 14, 15, 16. Each arcuate portion 14, 15, 16 comprises, respectively, constant and equal radii R1, R2, R3. The three linear segments are equally spaced about the circumference of the sprocket at intervals of approximately 120°. FIG. 9 is representative of the $1.5^{th}$ order load characteristic in a system using the sprocket shown in FIG. 2.

Figure 3:
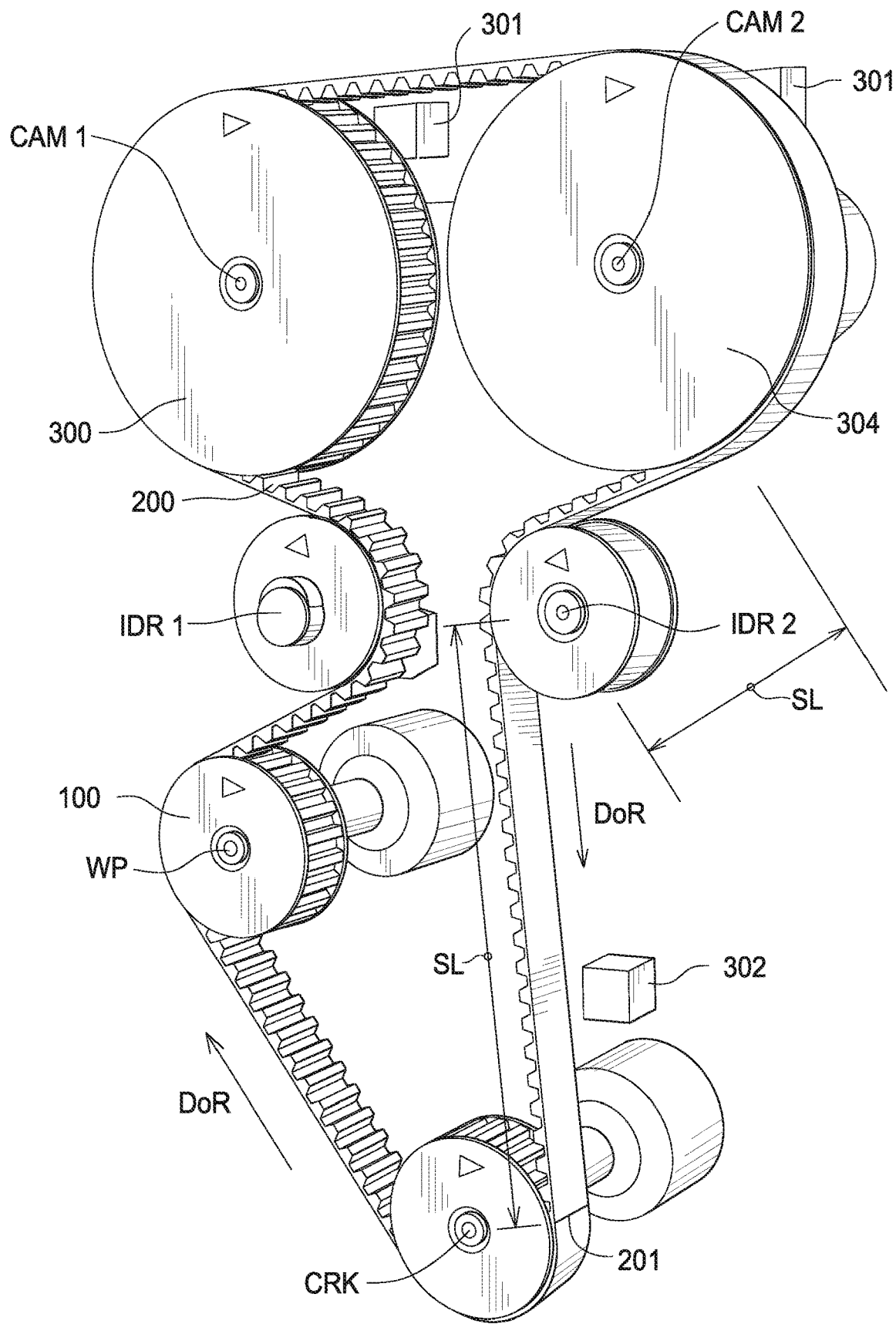
FIG. 3 is a perspective view of a twin cam, in-line four cylinder, four stroke, gasoline engine.
Figure 4:
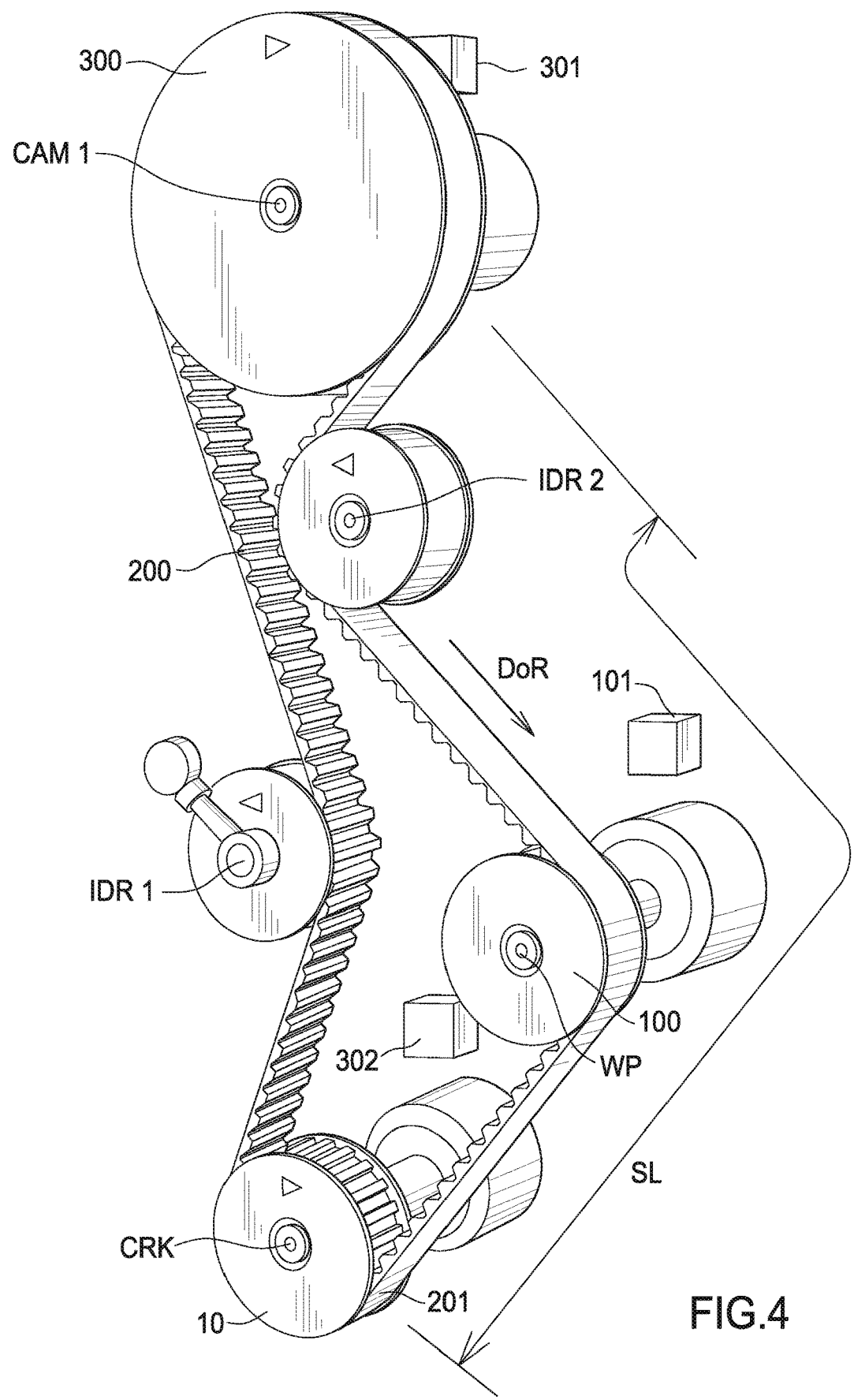
FIG. 4 is a perspective view of a single cam, in-line four cylinder, four stroke, diesel driven engine which has a fuel pump driven at the rear of the camshaft.
Figure 5:
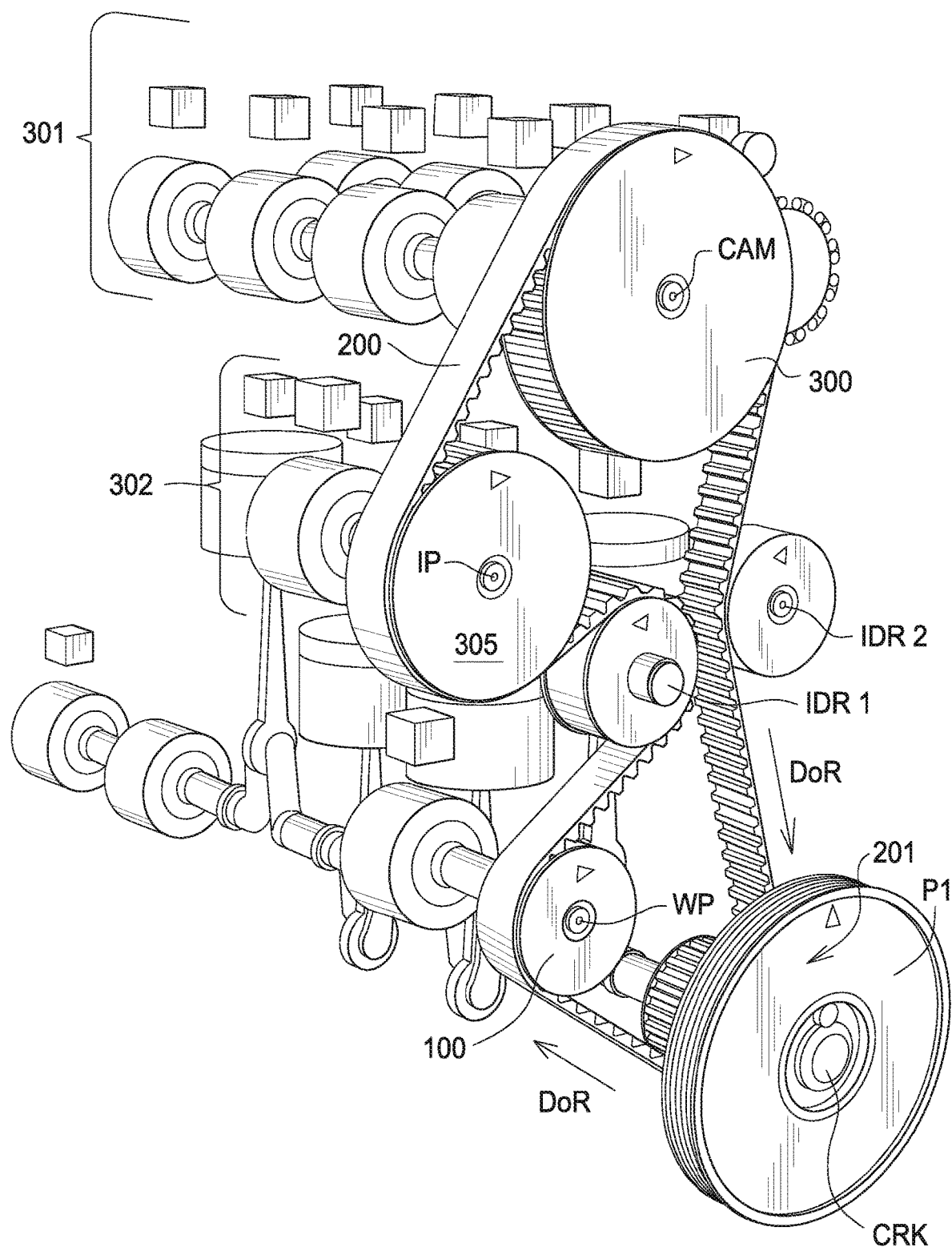
FIG. 5 is a perspective view of a single cam, four cylinder, four stroke, diesel driven engine with the fuel pump incorporated in the synchronous belt drive system.

FIGS. 3, 4 and 5 are some typical drive layouts for four cylinder, four stroke internal combustion engines using a toothed belt system to drive the camshaft and auxiliaries. These engines typically exhibit a high $2^{nd}$ order dynamic. Dependant upon fuel pump specification, some diesel engines may have a $1.5^{th}$ order which is dominant. Schematic diagrams showing such dynamics can be seen in FIGS. 7, 8 and 9.

In order to counteract $2^{nd}$ order dynamics, the inventive sprocket 10 is attached to the engine crankshaft Crk. Dependant on the presence of other dominant orders, it may be necessary to apply alternative embodiments of the sprocket. These may be attached to the crankshaft, but may equally be applied elsewhere in the system, for example on the water pump, fuel pump or on the camshaft sprocket(s). The engine crankshaft is the driver for the entire belt drive system. The driven direction of the belt is DoR. Due to the sprocket ratio, the engine crankshaft Crk rotates twice for each rotation of the camshaft CAM1.

In FIG. 3, sprocket 300 is connected to the camshaft CAM1 and sprocket 304 is connected to a second camshaft CAM2. Idlers Idr1 and Idr2 known in the art are used to maintain proper belt routing and tension control. Sprocket 100 is connected to the water pump WP. Belt 200 is trained among the several sprockets. The direction of rotation for belt 200 is shown as DoR. The point at which belt 200 engages crankshaft sprocket CRK is 201. The camshaft inertia and torque loads are represented by 301.

Toothed belt 200 is trained between sprocket 10 and cam sprocket 300. The belt entry point 201 is that point at which the belt 200 engages the sprocket. The belt span length between the crankshaft CRK and the cam sprocket 304 is "SL".

Similarly in FIGS. 4 and 5, camshaft sprocket 300 is attached to the engine camshaft CAM. In FIG. 4, the load characteristic 301 includes the torque characteristic of a fuel pump attached to the rear of the camshaft whereas in FIG. 5, the fuel pump torque is represented by load characteristic 302. Inertias and torque loads (301, 302, 101) caused by other components such as water and vacuum pumps may also be present as well, namely, WP (101) in FIG. 4 and FIG. 5. In FIG. 4 IDR1 and IDR2 are idlers known in the art to properly guide belt 200. In FIG. 4, the belt span length between the crankshaft sprocket 10 and the cam sprocket 300 is "SL".

For a gasoline engine the dominant cyclic fluctuating torque loads are normally a characteristic of the camshaft. For a diesel engine the dominant order can be produced by the camshaft and/or a fuel injection pump which may be included in the drive system. The torques caused by the water pump and vacuum pump may vary but they are not cyclic, within their own right, on the same period or frequency as the camshafts and are not normally dominant characteristics of the drive dynamics.

FIG. 5 is a perspective view of another single cam engine embodiment with fuel injection pump included in the drive for a diesel engine. In this embodiment, in addition to the system shown in FIG. 4 the system further comprises sprocket 305 connected to the fuel pump IP. Also shown is sprocket P1 which is engageable with another multi-rubbed belt used to drive various engine accessories (not shown). In FIG. 5 the cam loads are depicted by 301 and the fuel pump load by 302. Sprocket 100 is connected to the water pump WP. In FIG. 5 the torque load caused by a fuel injection pump is represented by 302.

Figure 7:
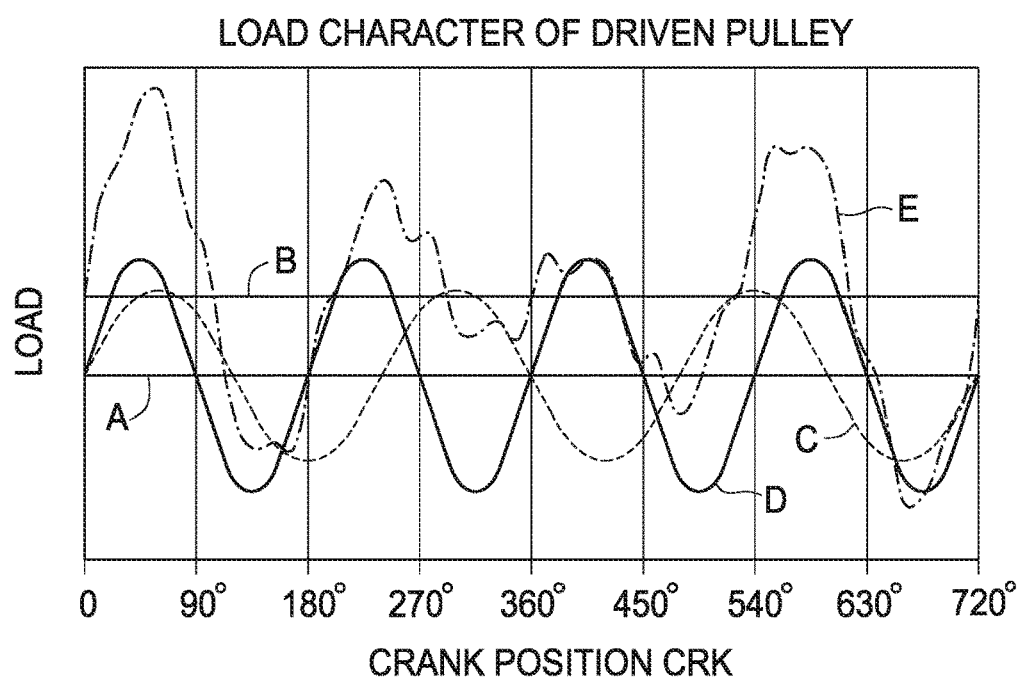
FIG. 7 is representative of a typical total load characteristic for the driven sprocket of a four cylinder, four stroke diesel engine, including extracted curves for the $1.5^{th}$ and $2^{nd}$ orders.

A typical total load characteristic for a four cylinder, four stroke engine is represented by curve "E" in FIG. 7. Curves "D" and "C" represent typical $2^{nd}$ and $1.5^{th}$ order characteristics which have been extracted from the total load characteristic. The load characteristic of an in-line four cylinder, four stroke, gasoline driven engine would not normally include a $1.5^{th}$ order.

Figure 8:
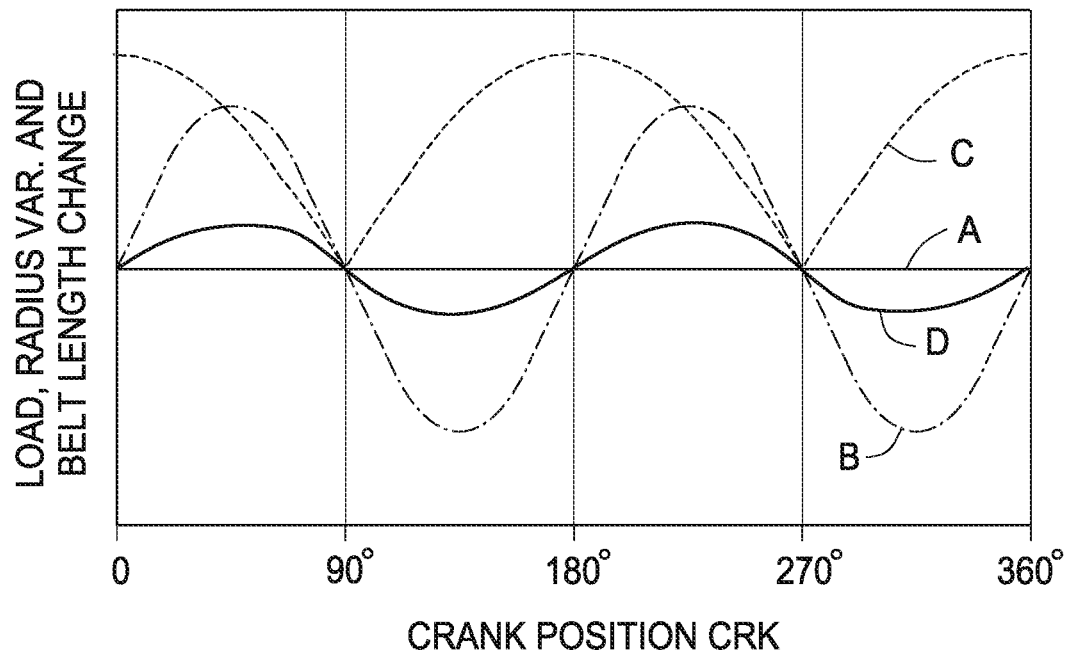
FIG. 8 is representative of the $2^{nd}$ order load characteristic for a driver sprocket of a four cylinder, four stroke engine.

The change in average radius at belt engagement point 201 of the inventive sprocket 10 as it rotates is curve "C" in FIGS. 8 and 9. The integral of curve "C", which is the effective length change of the belt in FIG. 4, is curve "D" on FIGS. 8 and 9. The derivative of the change in average sprocket radius is the acceleration of a given point on the toothed surface, 11, due to the change in sprocket shape.

In order to counteract $2^{nd}$ order dynamics, the flat portion 16 of the obround sprocket 10 is arranged in timing relation to the camshaft sprocket 300 such that an effective length of the belt 200 between sprocket 300 and sprocket 10 in FIG. 4 is made to vary in a manner that substantially cancels the alternating belt tensions caused by the cyclic camshaft torque fluctuations. As an example of a design to cancel $2^{nd}$ order dynamics, this can be achieved by timing the maximum length of the sprocket 10 (R1+R2+W) to coincide with the belt entry point 201 when the camshaft torque, and therefore belt tension, is at a maximum.

The absolute dimensional characteristic of a drive containing an obround sprocket is dependant on parameters such as the fluctuating torque, the belt span modulus, the inertias of each of the driven accessories in the system, the belt installation tension and the interaction between the belt and sprockets. The interaction between the belt and sprockets is dependant on parameters such as the number of teeth in mesh on the sprocket, the belt tooth modulus, the belt dimensions and the coefficient of friction between the belt and sprocket surfaces.

Figure 6:
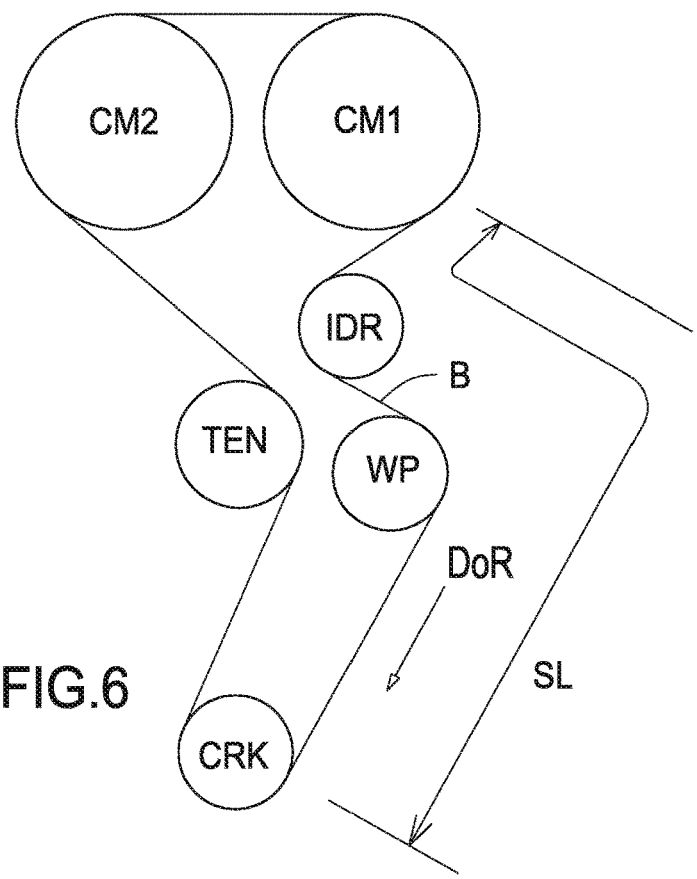
FIG. 6 is a schematic of a twin cam, four cylinder, four stroke, gasoline driven engine.

FIG. 6 is a schematic of a twin cam, four cylinder, four stroke gasoline engine. The illustrative system comprises cams CM1, CM2 and belt B trained there between. It further comprises tensioner TEN, water pump WP and crankshaft sprocket CRK. The direction of rotation of belt B is DoR. The span lengths of interest are between sprocket CRK and sprocket IDR, sprocket IDR and sprocket WP and sprocket CRK and sprocket WP. In FIG. 6, the belt span length between the crankshaft sprocket CRK and the cam sprocket CM1 is "SL". For calculation purposes since there is no major load impact between CM1 and CRK in DoR, these may be treated as one span "SL". Approximate typical values for the variables for the system described in FIG. 6 are as follows:

Typical Cam Torque fluctuations are: +40N/−30N
Belt Span Modulus: 240 Mpa
Typical component inertia values are:
CRK=0.4 $gm^2$
CM1=CM2=1.02 $gm^2$
WP=0.15 $gm^2$
Belt Installation Tension: 400N (The installation tension is maintained by the tensioner TEN in a manner known in the art).
Teeth in mesh on three sprockets: CRK⇒9 teeth; CM1, CM2⇒15 teeth.
Belt dimensions: width=25.4 mm; length=1257.3 mm
Typical values for the coefficient of friction for the sprocket surface 11 are in a range from 0.15 and 0.5, typically 0.2.

Typical belt installation tension values can be in the range of 75N up to 900N depending upon system requirements.

The belt span modulus is dependant on the tensile member construction, the number of strands of the tensile member within the belt and the belt width. An example of belt span modulus for a 25.4 mm wide belt having 20 tensile members would be in the region of approximately 240 Mpa.

FIG. 7 is representative of a typical total load characteristic for the driven sprocket of a four cylinder, four stroke diesel engine, including extracted curves for the $1.5^{th}$ (curve "C") and $2^{nd}$ (curve "D") orders. The load characteristic of an in-line four cylinder, four stroke, gasoline driven engine would not normally include a $1.5^{th}$ order. The "Offset" refers to W/2. The "Total Load" refers to FIG. 7, line "E".

In FIG. 7, Line "A" is zero torque. Line "B" depicts the average torque in the belt drive system. Curve "C" is the $1.5^{th}$ order torque characteristic extracted from the total load curve "E". Curve "D" is the $2^{nd}$ order torque characteristic extracted from the total load curve "E". Curve "E" is the total torque characteristic of the engine measured at the crankshaft CRK. The area under curve "E" represents the work done to turn the engine at a particular speed.

FIG. 8 is representative of the $2^{nd}$ order load characteristic (curve "B") for a driver sprocket of a four cylinder, four stroke engine including the change in radius (curve "C") for an obround sprocket and the resultant belt span length change (curve "D").

In FIG. 8, line "A" is zero torque. Curve "B" is the $2^{nd}$ order torque characteristic extracted from the total load. Curve "C" is the variation in effective crankshaft pulley radius as it rotates through 360 degrees caused by segment 16 in FIG. 1. Curve "D" is the integral of curve "C" and is the effective change in belt drive span length caused by the sprocket described in FIG. 1.

FIG. 9 is representative of the 1.5$^{th}$ order load characteristic "B" for a driver sprocket of a four cylinder, four stroke diesel engine with a three piston fuel pump, (or other driven device that will induce a 1.5$^{th}$ order), including the change in sprocket radius length (curve "C") for an alternative three lobe embodiment of the obround sprocket (FIG. 2) and the resultant belt span length change (curve "D"). Belt span length is the distance between the cam sprocket CAM and crankshaft sprocket CRK on FIG. 6 for example.

In FIG. 9, line "A" is zero torque. Curve "B" is the 1.5$^{th}$ order torque characteristic extracted from the total load. Curve "C" is the variation in effective crankshaft pulley radius as it rotates through 360 degrees. Curve "D" is the integral of curve "C" and is the effective change in drive length caused by the alternate embodiment of the sprocket described in FIG. 3.

Figure 10:
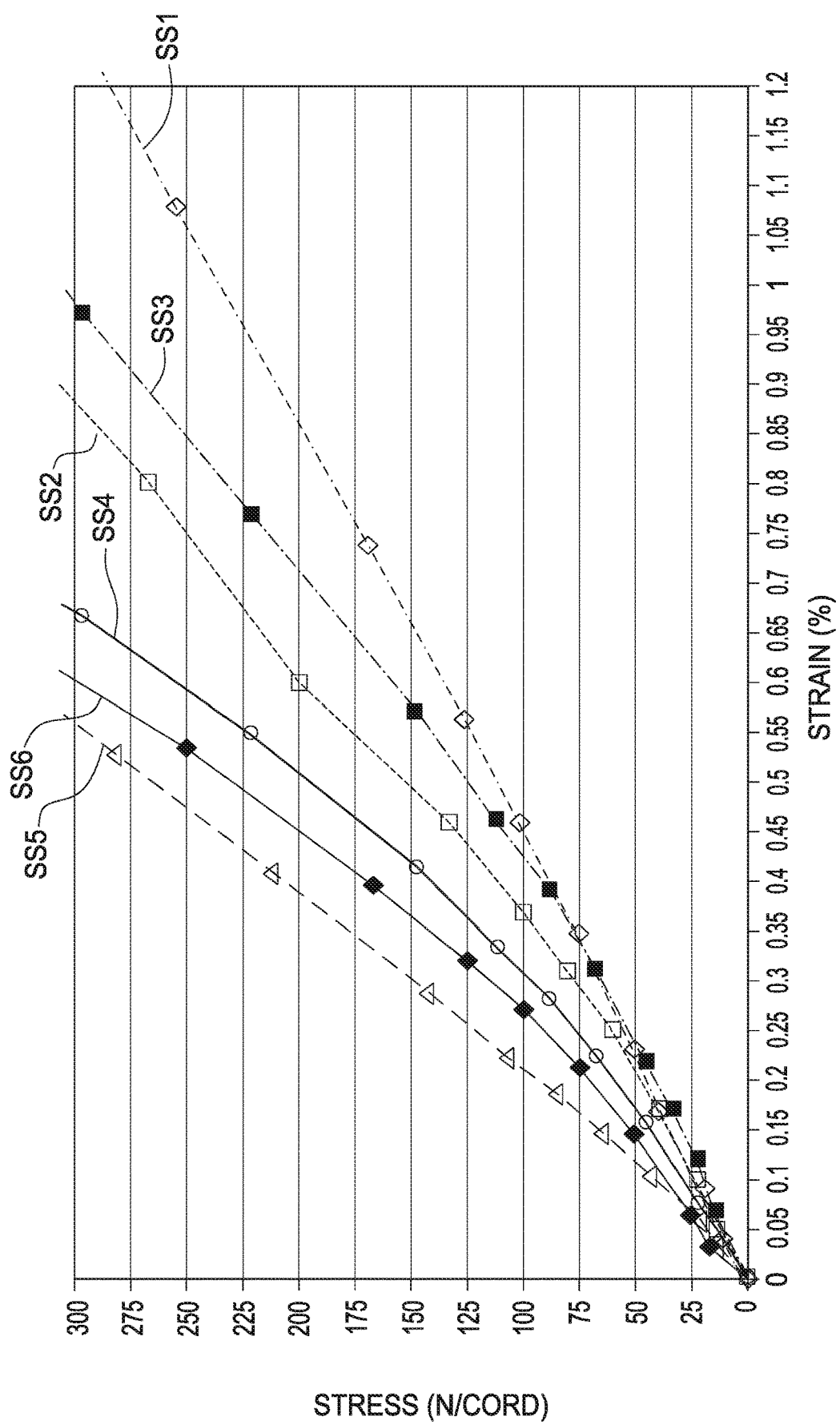
FIG. 10 is a family of curves representing stress/strain relationships for a synchronous belt.

The elastic modulus of a tensile member of a variety of belts used in the inventive system is shown in FIG. 10. The curves SS1 thru SS6 are known as stress-strain curves for a variety of belts 200. Each curve represents a modulus using a different material for the tensile cord in the belt. The elastomeric HNBR belt body is illustrative and not limiting. In addition to HNBR, other belt body materials can include EPDM, CR (chloroprene) and polyurethane, or a combination of two or more of the foregoing. The materials comprise for:

SS1 (fiberglass #1 tensile cord, HNBR body)
SS2 (fiberglass #2 tensile cord, HNBR body)
SS3 (fiberglass #3 tensile cord, HNBR body)
SS4 (carbon fiber tensile cord, HNBR body)
SS5 (Aramid™ tensile cord, HNBR body)
SS6 (carbon fiber tensile cord, HNBR body).

The elastic modulus of each tensile member is the slope of each curve SS1 thru SS6, as is known in the art. Typically this measurement and calculation is taken on the substantially linear portion of the curve. In addition to fiberglass, carbon fiber and Aramid™, another tensile member material may include fine filament stainless steel wire.

$$M = \Delta stress/\Delta strain \text{ (as measured in the substantially linear portion of the curve)}$$

The belt span modulus is dependant on the tensile member construction, the number of strands of the tensile member within the belt and the belt width. An example of belt span modulus for curve SS1, for a 25.4 mm wide belt with 20 strands of fiberglass tensile member, would be approximately 242 Mpa.

Figure 11:
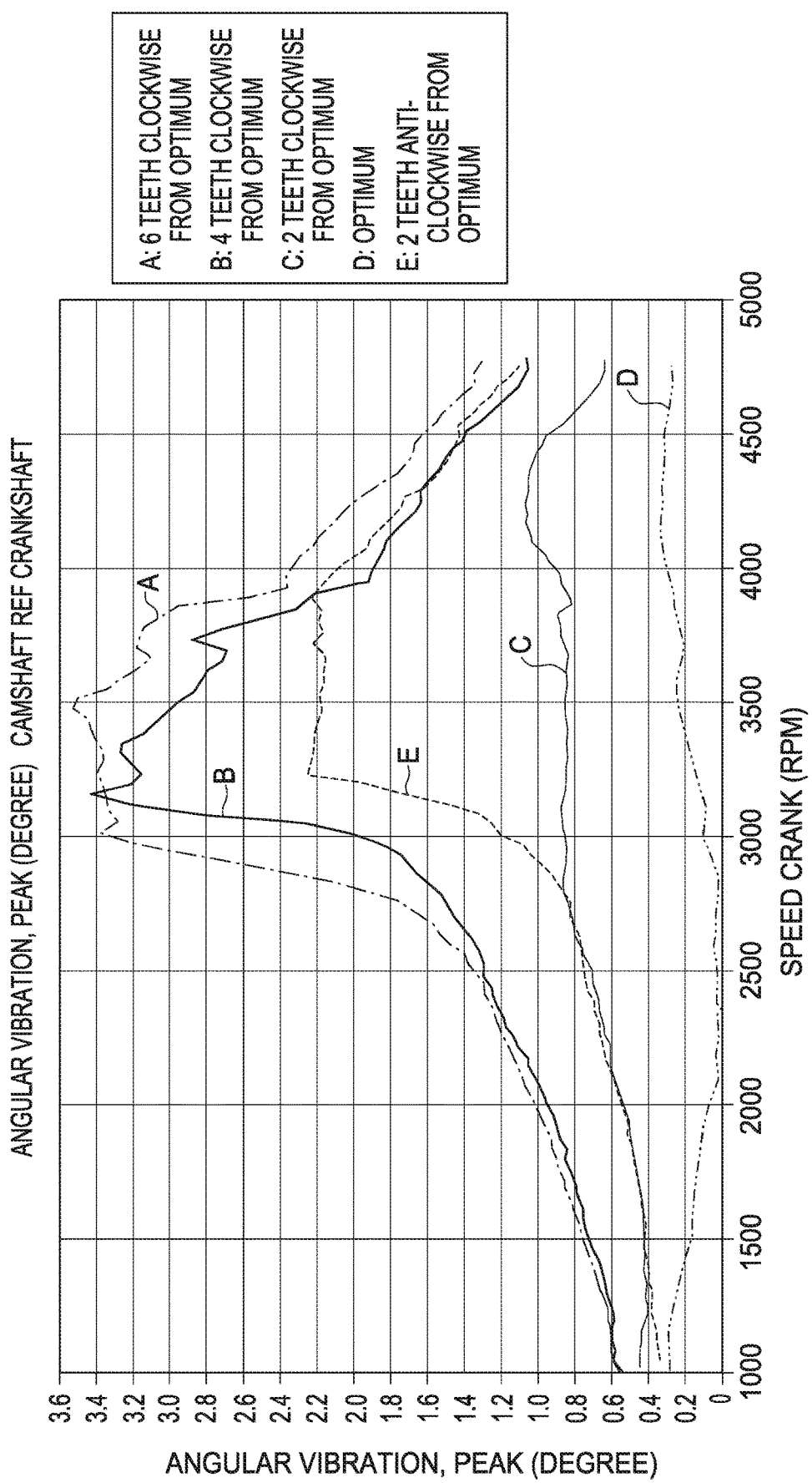
FIG. 11 is a series of curves showing the effects of the phasing/misphasing of an obround sprocket on the engine dynamic for the system in FIG. 6.

FIG. 11 is a series of curves showing the effects of the phasing/misphasing of an obround sprocket major length on the engine dynamic for the system in FIG. 6. Curve "D" is the optimum timing arrangement between the position of the sprocket major length to belt entry point 201 and torque pulse. Curves A, B, and C are mistimed clockwise from the curve "A" position by +6 +4 and +2 teeth respectively. Curve "E" is mistimed by 2 teeth in an anticlockwise direction. Phasing of maximum belt span length to peak torque and inertial load may vary dependent on the dominant orders of the drive and those which are to be diminished by the system. The belt entry point 201 is that point at which the belt engages the sprocket. In FIG. 3 the span length is "SL".

Regarding angular interval or phasing the allowable angular tolerance is calculated using the following:

$$+/- (360/2 \times \text{number of sprocket grooves}).$$

The belt drive span length is at a maximum when the torque is at a maximum.

Figure 12:
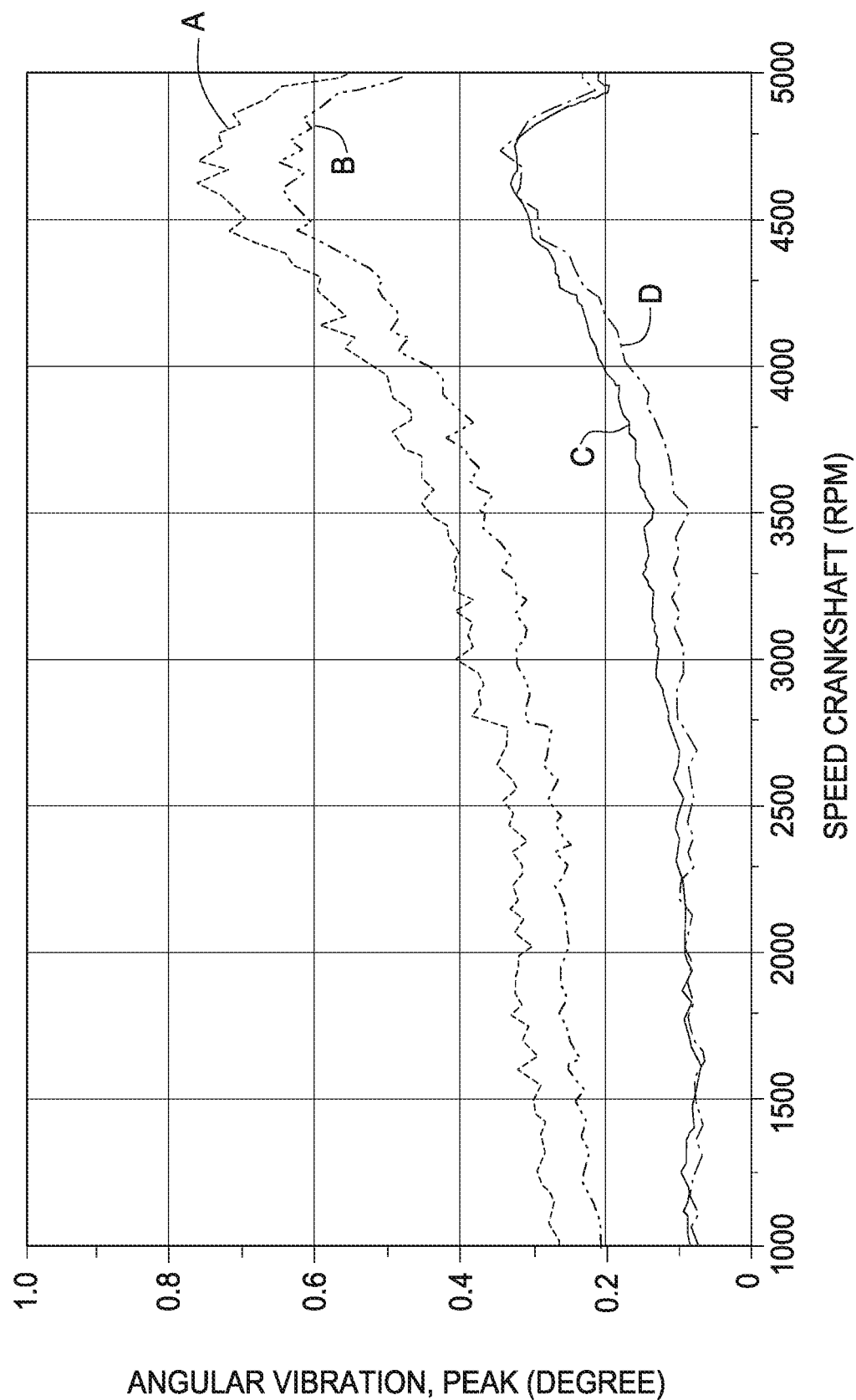
FIG. 12 is a chart showing the Angular Vibration characteristic at the camshaft of an engine shown in FIG. 6 before and after application of an obround sprocket.

FIG. 12 is a chart showing the effect of a correctly phased obround sprocket on a twin cam, four cylinder, four stroke engine as depicted in FIG. 6. Curves "A" and "B" represent measured values for angular vibration at the inlet and exhaust camshaft sprockets respectively for a prior art design using round sprockets.

By way of comparison, curves "C" and "D" represent measured values for angular vibration at the inlet and exhaust camshaft sprockets respectively with an inventive sprocket used on the crankshaft. The resultant reduction in angular vibration is approximately 50%.

Figure 13:
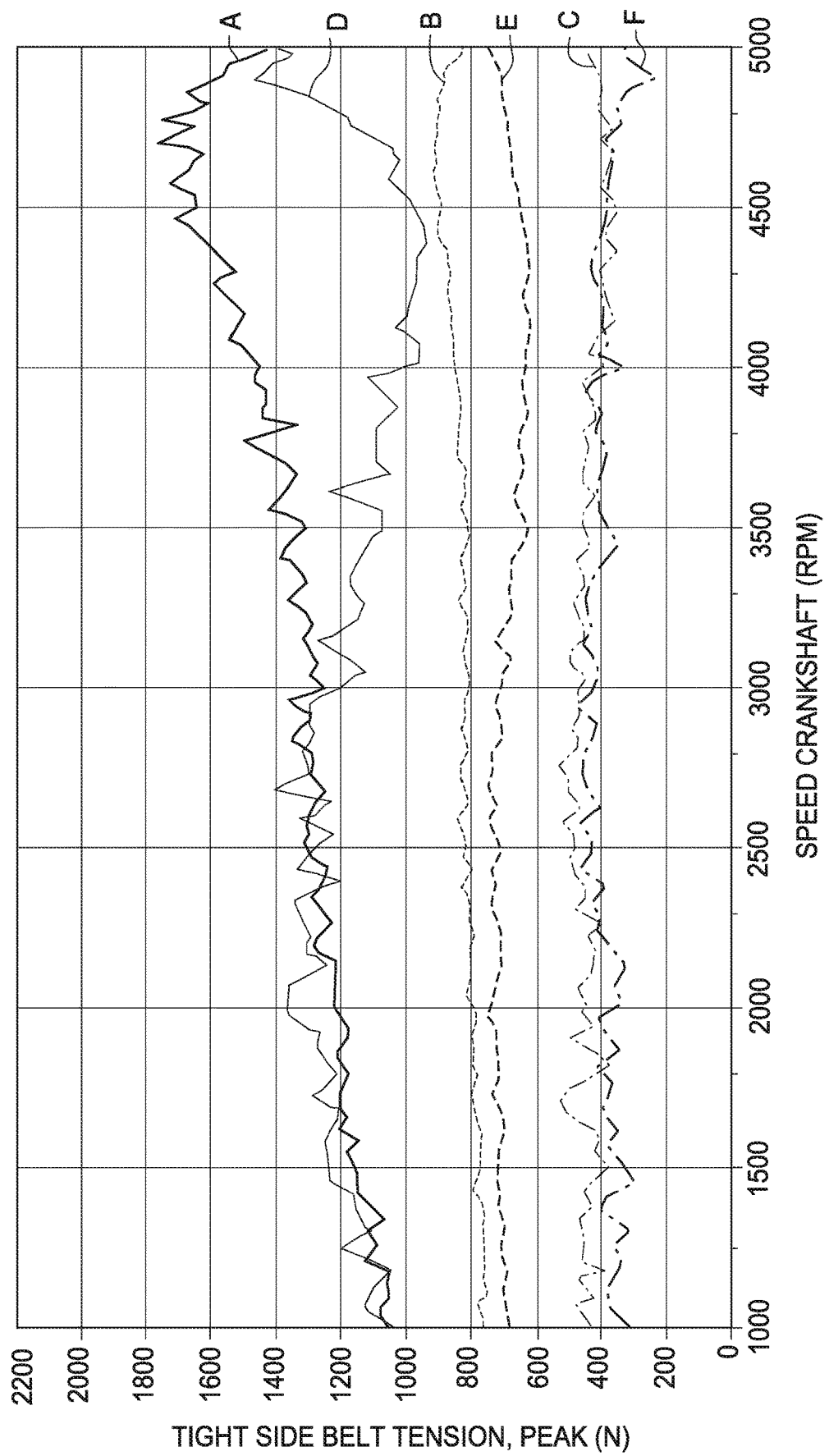
FIG. 13 is a chart showing the Tight Side Tension characteristic of an engine shown in FIG. 6 before and after application of an obround sprocket.

Similarly, FIG. 13 is a chart showing the effect of a correctly phased obround sprocket as described in FIG. 1 on a twin cam, four cylinder, four stroke engine as depicted in FIG. 6. Curves "A", "B" and "C" represent measured values for maximum, average and minimum dynamic tight side tensions respectively over a range of engine speeds for a prior art drive design. In this example, this tension was measured at position IDR in FIG. 6. For extended belt lifetime the belt tight side tension should be minimized. Curves "D", "E" and "F" represent measured values for maximum, average and minimum belt tight side tensions with the inventive sprocket in use. The resultant reduction in installation tight side tension is in the range of 50-60% in the resonant speed range of the engine (approximately 4000 rpm to approximately 4800 rpm). The decrease in belt tight side tension gives potential for significant improvement in the belt operating lifespan.

The inventive system is useful reduce timing error in IC engines. Timing error is the positional discrepancy between a driver and a driven shaft caused by random factors such as vibration, component inaccuracy and elastic deformation. In this case, it is the rotational inaccuracy of the camshafts (driven) of an IC engine in comparison to the crankshaft (driver) of the engine. It is normally reported in degrees pk to pk. For example, referring to FIG. 3, sprocket 300 and sprocket 304 are each obround. Use of the obround sprockets significantly reduces timing error which in turn gives improvement in fuel economy, lowers emissions and generally improves engine performance and efficiency. At a component level, reduced timing error and lower system loads lead to better durability and less potential for NVH issues. Reduction of tension reduces NVH levels, and especially meshing order, in the drive. The application of obround sprocket to reduce timing error is not limited only to the camshafts of an engine. The benefit can equally be obtained by inserting the obround sprocket on crank or fuel pump.

Figure 14:
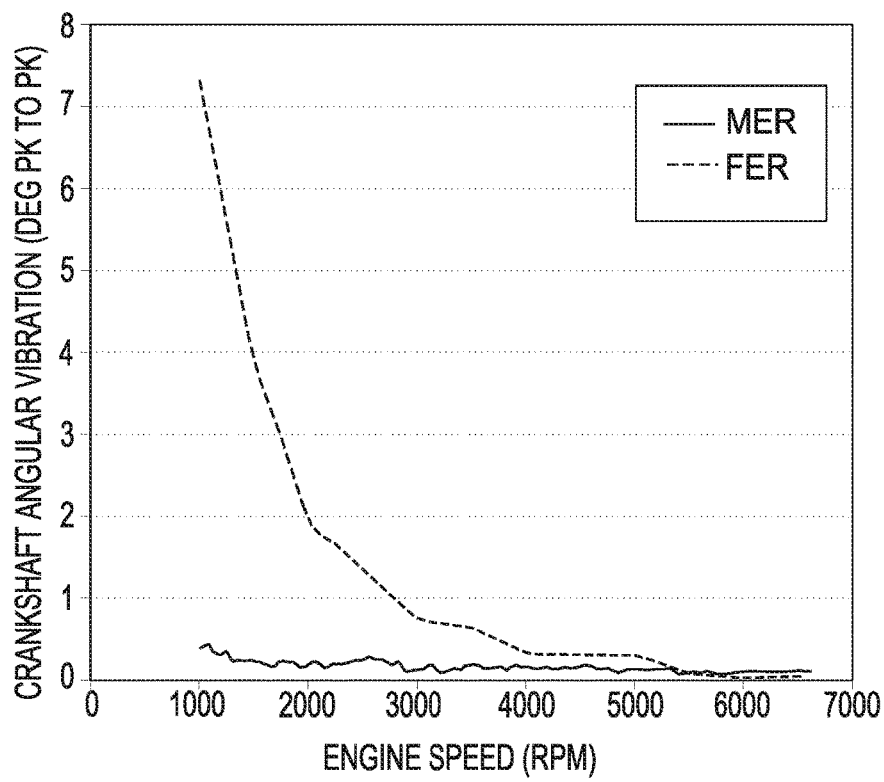
FIG. 14 is a chart of crankshaft rotation speed versus vibration angle.

FIG. 14 is a chart of crankshaft rotation speed versus angular vibration. The exemplary angular vibration diminishes as engine speed increases. FIG. 14 displays data for a motored engine and a firing engine. For a motored engine the crankshaft is driven by an electric motor, there is no fuel combustion in each cylinder. For a firing engine the crankshaft is driven in the normal manner for an internal combustion engine, i.e., with combustion of fuel in each cylinder. The motored engine (MER) reflects less angular vibration than the firing engine (FER) for a given engine rotational speed.

Figure 15:
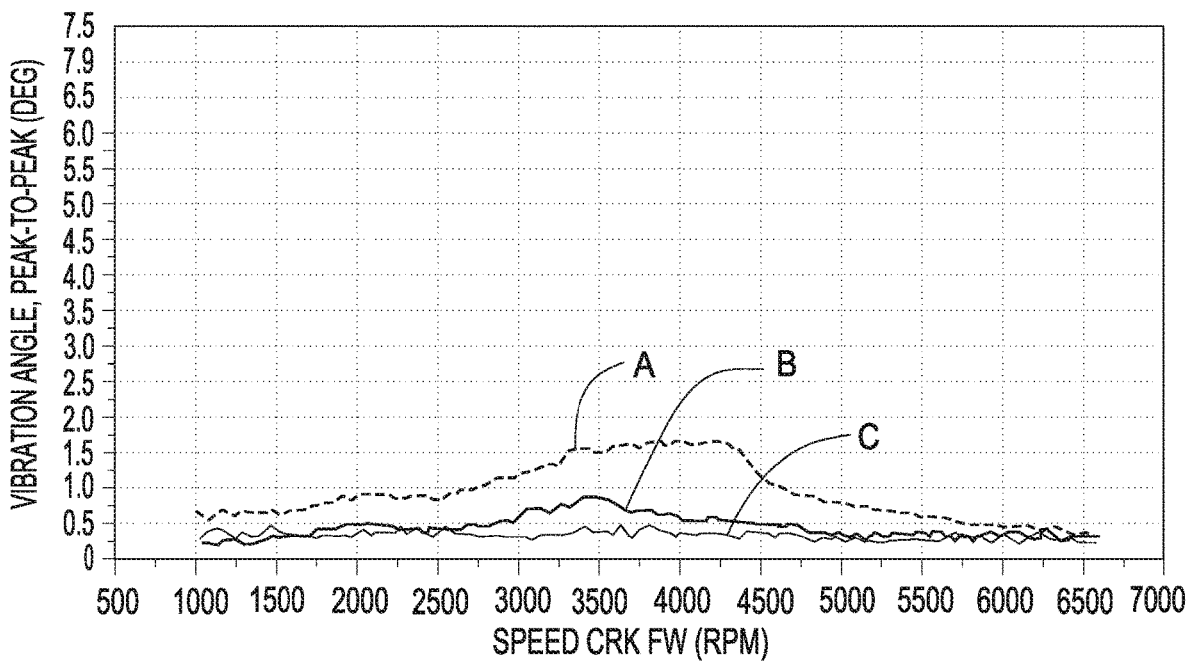
FIG. 15 is a chart of crankshaft speed versus vibration angle for an inlet cam.

FIG. 15 is a chart of crankshaft speed versus vibration angle for an inlet cam. An obround sprocket is mounted to the inlet valvetrain camshaft. Three conditions are shown. The first is for a standard drive system with no obround sprocket (Curve A). The second is with an obround sprocket and the third is with an obround sprocket and a high modulus belt (Curve B). The phase and magnitude of the obround sprocket is 10.5 pitches from 3 o'clock position and 1.5 mm. The standard belt modulus is 630,000N and the high modulus belt modulus is 902,000N. The modulus is given in Newtons (N) and is defined as the force required to extend a unit length by 100%.

The vibration angle for the third condition (Curve C) is significantly reduced to less than 0.5 deg peak-to-peak when compared to the value for the standard drive system at about 1.5 deg peak-to-peak, both measured at 4000 RPM.

Figure 16:
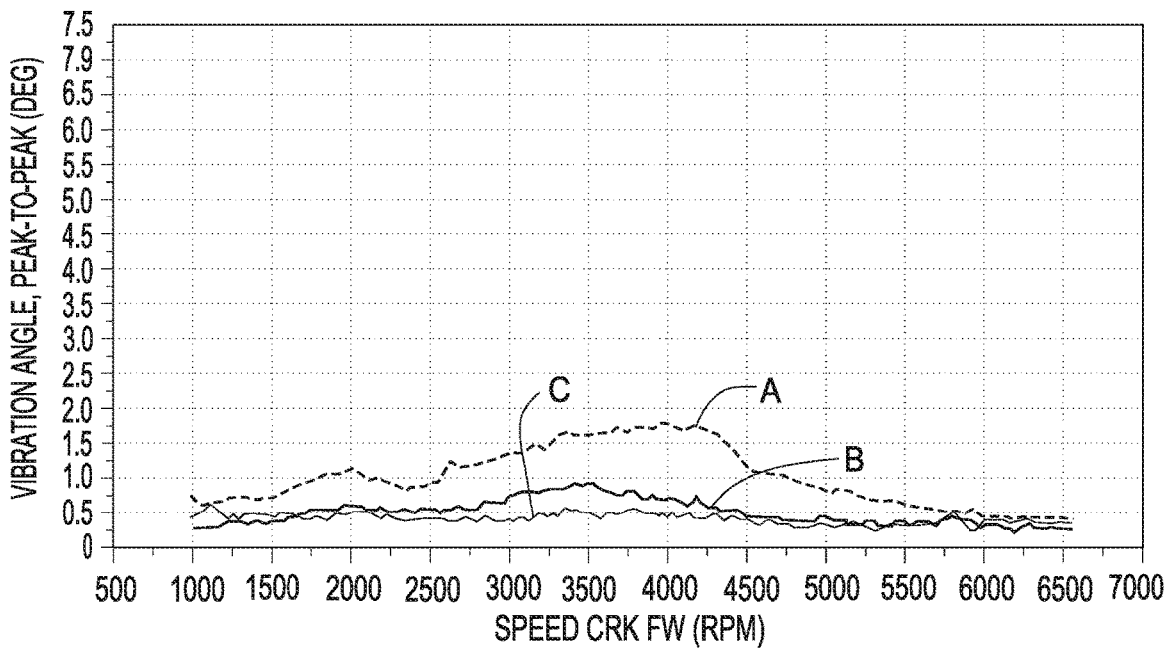
FIG. 16 is a chart of crankshaft speed versus vibration angle for an exhaust cam.

FIG. 16 is a chart of crankshaft speed versus vibration angle for an exhaust cam. An obround sprocket is mounted to the exhaust valvetrain camshaft. Three conditions are shown. The first is for a standard drive system with no obround sprocket (Curve A). The second is with an obround sprocket and the third is with an obround sprocket and a high modulus belt (Curve B). The vibration angle for the third condition is significantly reduced to about 0.5 deg peak-to-peak when compared to the value for the standard drive system at about 1.5 deg peak-to-peak, both measured at 4000 RPM (Curve C). However, depending on the engine the improvement can range from under 1.5 deg peak-to-peak to about 0.5 deg, a reduction of just over 60%. The phase and magnitude of the obround sprocket is 23.5 pitches from 3 o'clock position and 1.5 mm. The standard belt modulus is about 630,000N and the high modulus belt modulus is about 902,000N.

Figure 17:
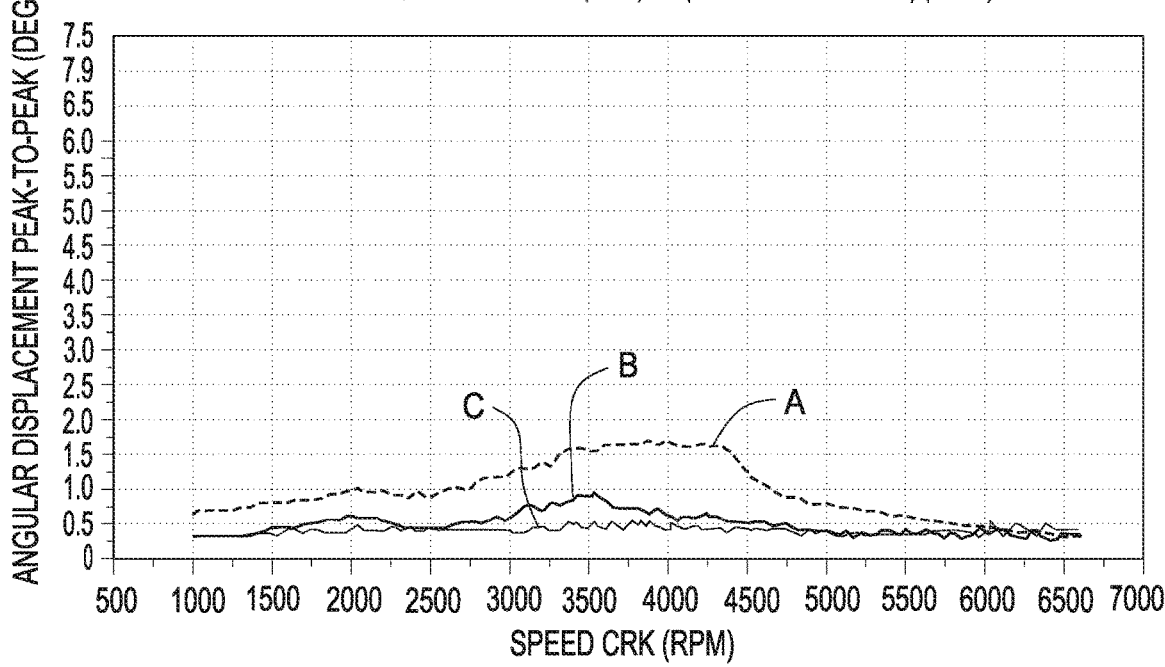
FIG. 17 is a chart of crankshaft speed versus angular displacement for an inlet cam.

FIG. 17 is a chart of crankshaft speed versus angular displacement for an inlet cam. Angular displacement is also referred to as timing error and is measured relative to crankshaft position. An obround sprocket is mounted to the inlet valvetrain camshaft. Three conditions are shown. The first is for a standard drive system with no obround sprocket (Curve A). The second is with an obround sprocket and the third is with an obround sprocket and a high modulus belt (Curve B). The angular displacement for the third condition is significantly reduced to less than 0.5 deg peak-to-peak when compared to the value for the standard drive system at about 1.5 deg peak-to-peak, both measured at 4000 RPM (Curve C). However, depending on the engine the improvement can range from under 1.5 deg peak-to-peak to about 0.5 deg, a reduction of just over 60%. The phase and magnitude of the obround sprocket is 10.5 pitches from the 3 o'clock position and 1.5 mm. The standard belt modulus is about 630,000N and the high modulus belt modulus is about 902,000N.

Figure 18:
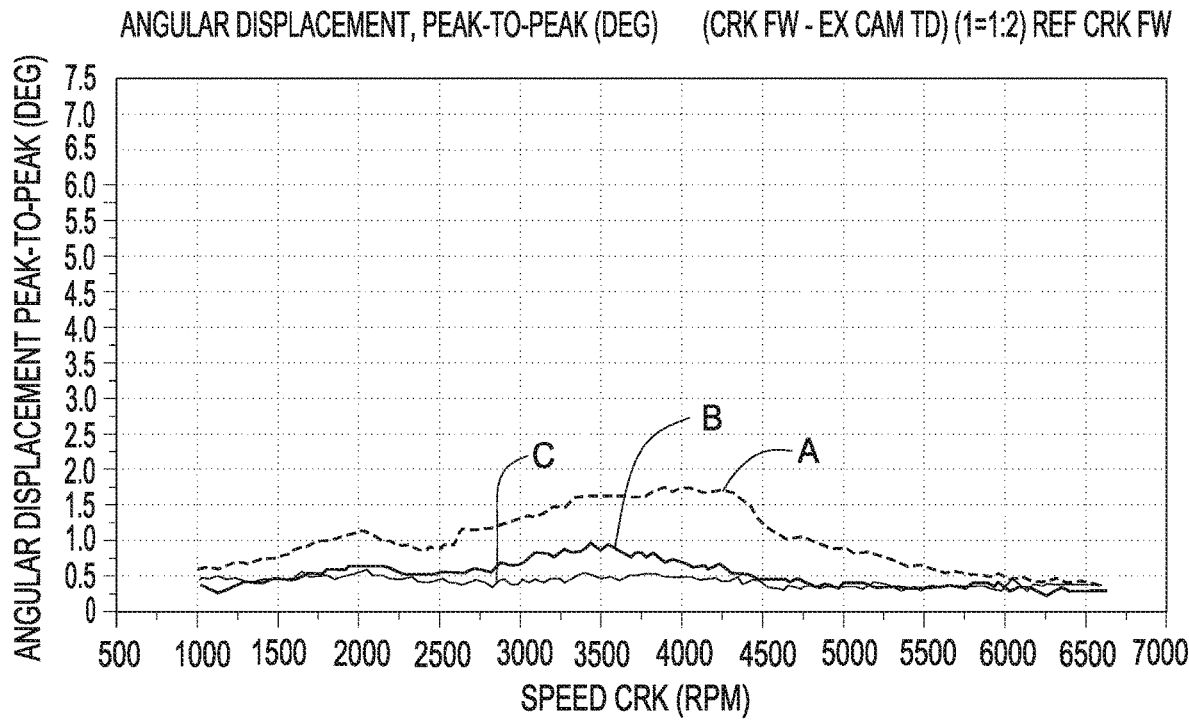
FIG. 18 is a chart of crankshaft speed versus angular displacement for an exhaust cam.

FIG. 18 is a chart of crankshaft speed versus angular displacement for an exhaust cam. An obround sprocket is mounted to the exhaust valvetrain camshaft. Three conditions are shown. The first is for a standard drive system with no obround sprocket (Curve A). The second is with an obround sprocket (Curve B) and the third is with an obround sprocket and a high modulus belt (Curve C). The angular displacement for the third condition is significantly reduced to about 0.5 deg peak-to-peak when compared to the value for the standard drive system at about 1.5 deg peak-to-peak, both measured at 4000 RPM. However, depending on the engine the improvement can range from under 1.5 deg peak-to-peak to about 0.5 deg, a reduction of just over 60%. The phase and magnitude of the obround sprocket is 23.5 pitches from the 3 o'clock position and 1.5 mm. The standard belt modulus is about 630,000N and the high modulus belt modulus is about 902,000N.

Figure 19:
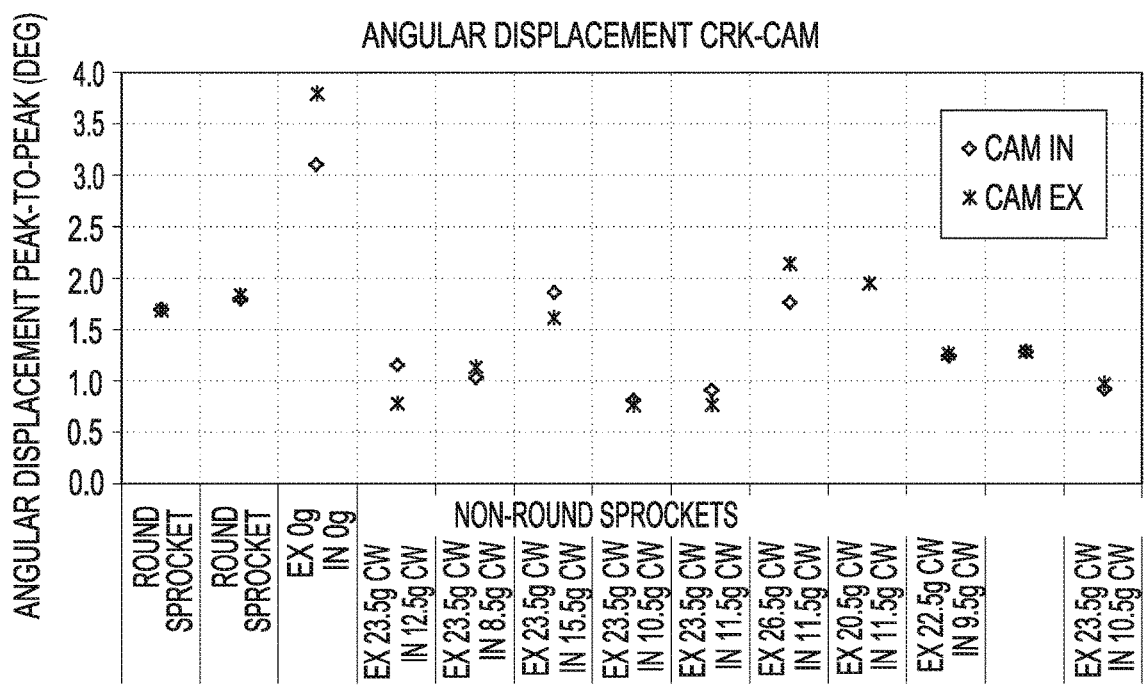
FIG. 19 is a diagram showing the effect of the obround sprocket phasing relative to each camshaft timing error.

FIG. 19 is a diagram showing the effect of the obround sprocket phasing relative to each camshaft timing error. The Y axis is angular displacement, or timing error, of each cam sprocket with reference to the crankshaft. It is quoted as a peak to peak value, that is, the numerical difference between min and max. Columns 1 and 2 of the diagram report a standard drive set up using all round sprockets. Column 3 reports use of a $3^{rd}$ order obround sprocket installed on the inlet and the exhaust camshaft. Each sprocket is positioned such that max offset is in line with the cam shaft lobes. Columns 4 to 13 report various trials using differing offsets of the obround sprockets. The "3 o'clock" position is the datum for all offsets. The values given are simply the number of pitches, or grooves "g", through which the sprocket datum point was rotated from that position. "Datum point" is the point used as reference for angular measurements. This is set @ the 12 o'clock position. "cw" refers to clockwise. For example, "Ex 23.5 g cw" refers to the 3 o'clock position and the exhaust cam obround sprocket having an offset of 23.5 grooves in the clockwise direction from the 3 o'clock position on the engine.

Figure 20:
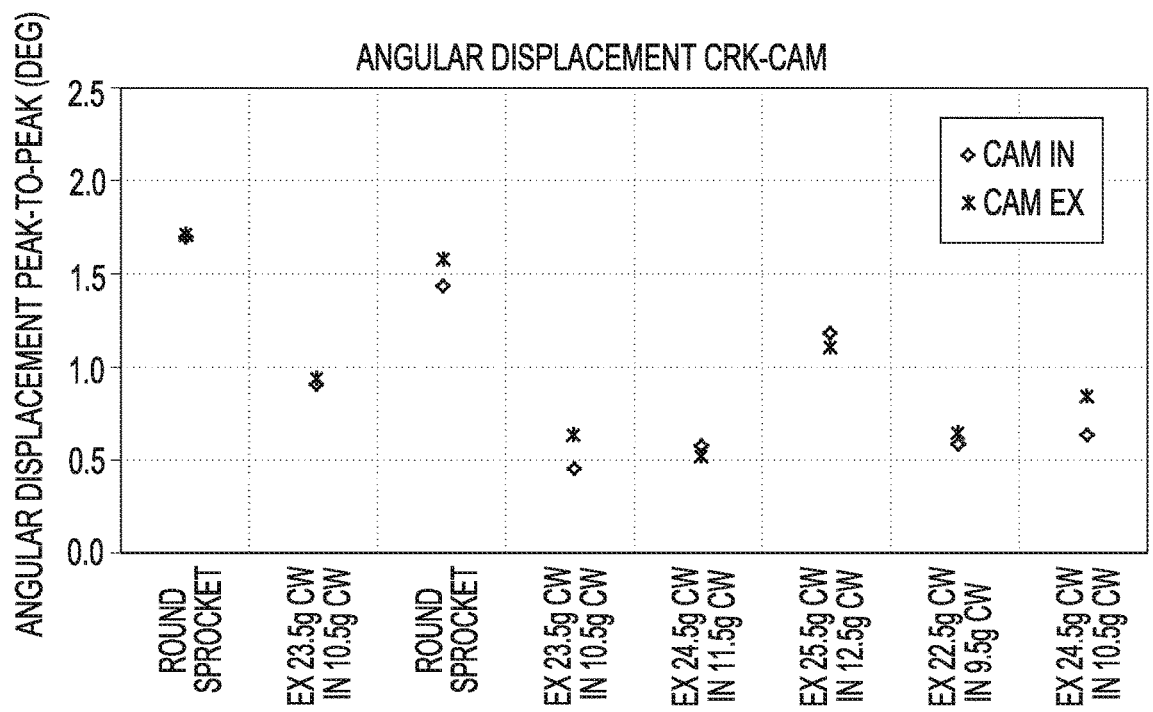
FIG. 20 is a diagram showing the effect of the obround sprocket phasing relative to each camshaft timing error with a standard and high modulus belt.

FIG. 20 is a diagram showing the effect of the obround sprocket phasing relative to each camshaft timing error with a standard and high modulus belt. The Y axis is angular displacement in degrees peak-to-peak, or timing error, of each cam sprocket with reference to the crankshaft. It is quoted as a peak to peak value, that is, the numerical difference between min and max. Columns 1 and 3 of the diagram report a standard drive set up using all round sprockets. Each column reports use of a $3^{rd}$ order obround sprocket installed on the inlet and the exhaust camshaft. Each sprocket is positioned such that max offset is in line with the cam shaft lobes. Columns 2 and 4 to 8 report various trials using differing offsets of the obround sprockets. The "3 o'clock" position is the datum for all offsets. The values given are simply the number of pitches, or grooves, through which the sprocket datum point was rotated from that position. "Datum point" is the point used as reference for angular measurements. This is set @ the 3 o'clock position. The phase and magnitude of the obround sprocket is 23.5 pitches for the exhaust and 10.5 pitches for the inlet from the 3 o'clock position and 1.5 mm for each. The standard belt modulus is about 630,000N and the high modulus belt modulus is about 902,000N.

Figure 21:
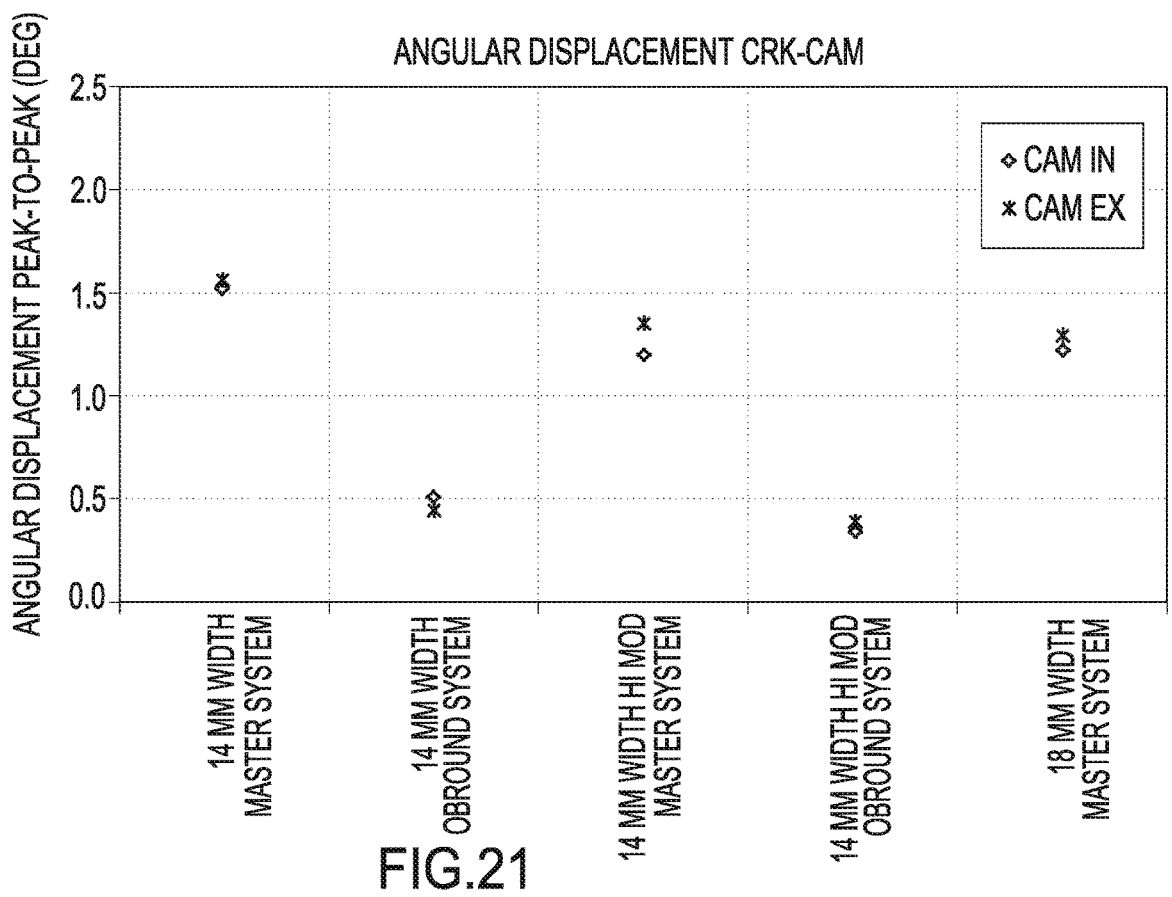
FIG. 21 is a diagram showing the effect of an obround sprocket on timing error by belt width.

FIG. 21 is a diagram showing the effect of an obround sprocket on timing error by belt width. Column 1 reports a 14 mm wide belt in a system using round sprockets. Column 2 reports a 14 mm wide belt in a system using obround sprockets. Column 3 reports a 14 mm wide belt using a high modulus belt in a system using standard sprockets. Column 4 reports 14 mm wide belt using a high modulus belt in a system using obround sprockets. Column 5 reports an 18 mm wide belt using a standard modulus belt in a system using standard sprockets.

Figure 22:
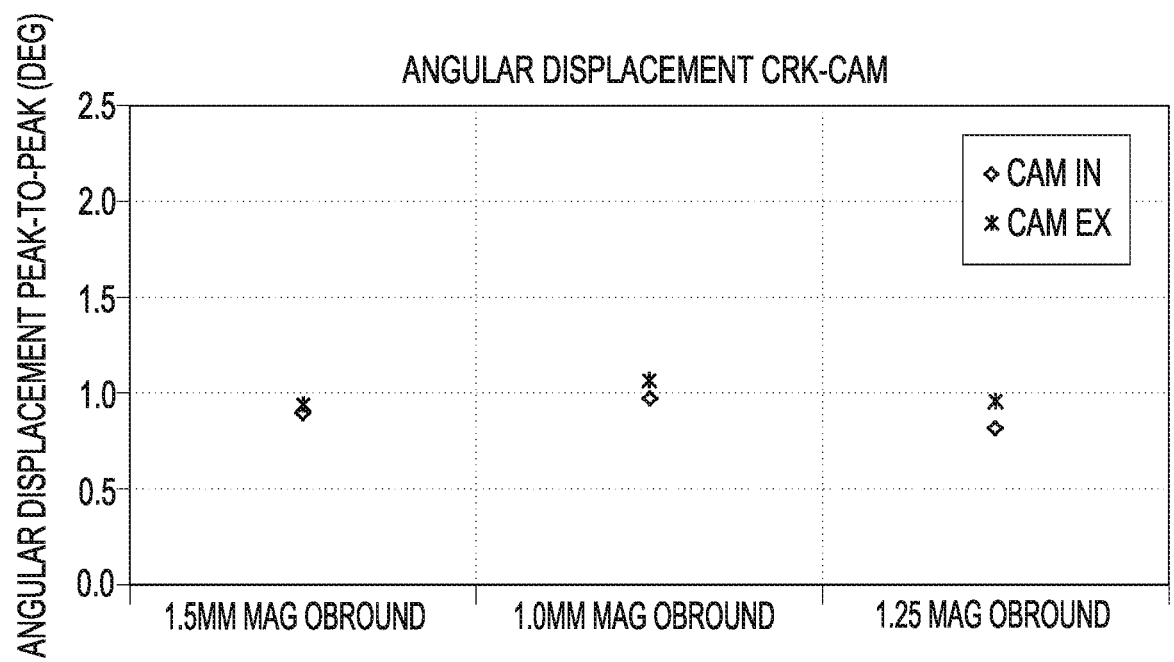
FIG. 22 is diagram showing the effect of an obround sprocket in timing error by magnitude of eccentricity.

FIG. 22 is diagram showing the effect of an obround sprocket in timing error by magnitude of eccentricity. Each column reports an obround sprocket used on the inlet and outlet camshafts. The magnitude of eccentricity for each system ranges from 1.0 mm to 1.5 mm.

Testing to validate the effectiveness of the obround sprocket to reduce belt drive system dynamics can be carried out on both motored and firing engines. The results for timing error improvement included in the Figures were generated on a motored engine. While in most cases these results transfer to a firing engine, in some cases obround sprockets do not reduce dynamics on certain engines. Testing should be performed on a firing engine to assure the required improvements are achieved and are reliable. The steps necessary to conduct the testing are known in the engine dynamics art. These also include that the vibration sensors need to operate in an oil environment, need to be able to withstand up to 160 C, and need to be able to withstand chemical attack from oil and additives. Consistency checks are carried out at beginning and end of each series of test runs. Measurements are taken during a run up from idle to max engine speed over a 60 sec ramp. A standard Rotec system is used for data capture and analysis.

Although forms of the invention have been described herein, it will be obvious to those skilled in the art that variations may be made in the construction and relation of parts without departing from the spirit and scope of the inventions described herein.

I claim:

1. A synchronous belt drive system comprising:
   a first obround sprocket (10) having a toothed surface and at least one linear portion (16) disposed between two arcuate portions (14,15), the arcuate portions having a constant radius (R1, R2), the linear portion having a predetermined length;
   a sprocket (300) having a toothed surface, the sprocket engaged to the first obround sprocket by an endless toothed member (200); and
   the first obround sprocket (10) having a magnitude and a phase such that an angular displacement timing error between the sprocket and the first obround sprocket is less than 1.5 degree peak to peak.

2. The synchronous belt drive system as in claim 1 further comprising:
   a second obround sprocket connected to a second rotary load, the second obround sprocket engaged with the endless toothed member; and
   the second obround sprocket having a magnitude and a phase such that an angular displacement timing error between the sprocket and the second obround sprocket is less than 1.5 degree peak to peak.

3. The synchronous belt drive system as in claim 1, wherein the angular displacement timing error between the sprocket and the first obround sprocket is less than 0.5 degree peak to peak.

4. The synchronous belt drive system as in claim 2, wherein the angular displacement timing error between the sprocket and the second obround sprocket is less than 0.5 degree peak to peak.

5. The synchronous belt drive system as in claim 1, wherein a width of the endless toothed member is equal to or greater than 12 mm.

6. The synchronous belt drive system as in claim 1, wherein the endless toothed member comprises a modulus in the range of about 630,000N to about 902,000N.

7. The synchronous belt drive system as in claim 1, wherein the magnitude is in the range of approximately 1.0 mm to 1.5 mm.

8. The synchronous belt drive system as in claim 1, wherein the phase of the first obround sprocket is in the range of 9 grooves to 25 grooves when rotated relative to a datum point.

9. The synchronous belt drive as in claim 8, wherein the datum point is with respect to a 3 o'clock position.

10. The synchronous belt drive system as in claim 2, wherein the phase of the second obround sprocket is in the range of 9 grooves to 25 grooves when rotated relative to a datum point.

11. The synchronous belt drive as in claim 10, wherein the datum point is with respect to a 3 o'clock position.

12. The synchronous belt drive system as in claim 10, wherein the phase of the first obround sprocket is in the range of 9 grooves to 25 grooves when rotated relative to a datum point.

13. The synchronous belt drive as in claim 12, wherein the datum point is with respect to a 3 o'clock position.

14. The synchronous belt drive system as in claim 1, wherein the sprocket is connected to a driver and the first obround sprocket is connected to a rotary load.

15. The synchronous belt drive system as in claim 14, wherein the driver is an engine crankshaft.

16. The synchronous belt drive system as in claim 2, wherein the first obround sprocket is connected to an exhaust camshaft.

17. The synchronous belt drive system as in claim 2, wherein the second obround sprocket is connected to an inlet camshaft.

18. A synchronous belt drive system comprising:
   a first obround sprocket having a toothed surface and at least one linear portion disposed between two arcuate portions, the arcuate portions having a constant radius, the linear portion having a predetermined length;
   a sprocket having a toothed surface, the sprocket engaged to the first obround sprocket by an endless toothed member;
   the first obround sprocket having a magnitude and a phase such that an angular displacement timing error between the sprocket and the first obround sprocket is less than 1 degree peak to peak;
   a second obround sprocket connected to a second rotary load, the second obround sprocket engaged with the endless toothed member; and
   the second obround sprocket having a magnitude and a phase such that an angular displacement timing error between the sprocket and the second obround sprocket is less than 1.5 degree peak to peak.

19. The synchronous belt drive system as in claim 18, wherein the first obround sprocket is connected to an exhaust camshaft and wherein the second obround sprocket is connected to an inlet camshaft and the sprocket is connected to an engine crankshaft.

20. The synchronous belt drive system as in claim 19, wherein the angular displacement timing error between the sprocket and the first obround sprocket is less than 0.5 degree peak to peak, and wherein the angular displacement timing error between the sprocket and the second obround sprocket is less than 0.5 degree peak to peak.

* * * * *